United States Patent [19]
Walter et al.

[11] Patent Number: 5,217,094
[45] Date of Patent: Jun. 8, 1993

[54] SELF-ADJUSTING, PUSH-TO-RELEASE PARKING BRAKE CONTROL

[75] Inventors: Timothy J. Walter; LaVern R. McCallips, both of Roscoe, Ill.

[73] Assignee: Atwood Industries, Inc., Rockford, Ill.

[21] Appl. No.: 743,270

[22] Filed: Aug. 9, 1991

[51] Int. Cl.⁵ .............................. B60G 5/06
[52] U.S. Cl. ...................... 188/210; 74/535
[58] Field of Search ............. 188/210; 74/535, 542, 74/540, 574

[56] References Cited

U.S. PATENT DOCUMENTS

| | | | |
|---|---|---|---|
| 3,875,820 | 4/1975 | Morden | 188/162 |
| 4,570,508 | 2/1986 | Nicholson et al. | 74/535 |
| 4,841,798 | 6/1989 | Porter et al. | 74/535 |
| 4,872,368 | 10/1989 | Porter | 74/542 |

FOREIGN PATENT DOCUMENTS 2059022 4/1981 United Kingdom ............... 74/535

Primary Examiner—Matthew C. Graham
Attorney, Agent, or Firm—Leydig, Voit & Mayer

[57] ABSTRACT

A parking brake control in which a spiral spring is loaded between a sector and a pedal and unwinds to take up slack in the cable of a vehicle parking brake and tension the cable when a locking pin is removed following installation of the control and connection of the cable to the sector. A pawl coacts with the same sector to hold the sector in its brake-applied position and to enable release of the brake by pushing on the pedal. A cam is carried by the pedal and acts against the cable to produce a mechanical advantage which progressively increases as the brake is progressively applied.

6 Claims, 4 Drawing Sheets

SELF-ADJUSTING, PUSH-TO-RELEASE PARKING BRAKE CONTROL

BACKGROUND OF THE INVENTION

This invention relates generally to apparatus for applying and releasing a vehicular parking brake. Typically, such apparatus includes a control with a foot-operated lever or pedal which, when depressed, acts to turn a toothed sector and apply tension to a cable in order to set the parking brake of the vehicle. Once the brake has been set, a pawl engages and holds the sector to prevent the return springs of the brake and the brake clamp load from effecting release of the brake.

More specifically, the invention relates to a self-adjusting, push-to-release parking brake control. A self-adjusting control includes an initially tightly wound torsion spring which urges the sector in a brake-applying direction. When the control is being installed in a vehicle, the sector is locked against being turned by the spring. After the control has been installed and the brake cable has been connected to the sector, the sector is unlocked and is automatically rotated by the tightly wound spring until the slack in the cable is taken up and the cable is tensioned sufficiently to preload the return springs of the parking brake. In this way, the cable and the return springs are placed under a specified preload by the torsion spring once the cable has been hooked up and the sector has been released to the action of the torsion spring.

A push-to-release parking brake control is one which effects release of the parking brake when the foot-operated pedal is again depressed after the brake has been set. Depression of the pedal releases the pawl from the sector an allows release of the brake.

Self-adjusting, push-to-release parking brake controls are known. One such control requires two sectors. One of the sectors coacts with a pawl to perform the holding and push-to-release functions while the other sector is required to enable the control to self-adjust.

Significant input force is required to set the brake. In order to generate such force with relatively low manual effort, the control is equipped with a curved cam which acts against the cable to produce a mechanical advantage. In the two-sector control discussed above, the cam is carried by one of the sectors and produces a mechanical advantage of fixed ratio. That is to say, the mechanical advantage is constant throughout the entire operating range of the control. As a result, relatively low-effort is required to set the brake lightly but significantly greater effort is required to set the brake to its fully applied condition.

SUMMARY OF THE INVENTION

One of the aims of the present invention is to provide a new and improved self-adjusting, push-to-release brake control that requires only a single sector and thus is lighter in weight and lower in cost than prior controls of the same general type.

A further object of the invention is to provide a self-adjusting, push-to-release parking brake control which produces a mechanical advantage of variable ratio to reduce the manual effort required to fully set the brake.

More detailed objects of the invention are to achieve the foregoing through the provision of a parking brake control in which the sector which holds the parking brake set is free to rotate relative to the pedal and effect self-adjustment once the control has been installed and the sector has been released to the action of the torsion spring; through the provision of a control in which the pawl is uniquely controlled to effect push-to-release, and through the provision of a control in which the cam for applying force to the cable is carried by the pedal and is of variable ratio.

These and other objects and advantages of the invention will become more apparent from the following detailed description when taken in conjunction with the accompanying drawings.

DETAILED DESCRIPTION OF THE PREFERRED EMBODIMENT

Figure 1:
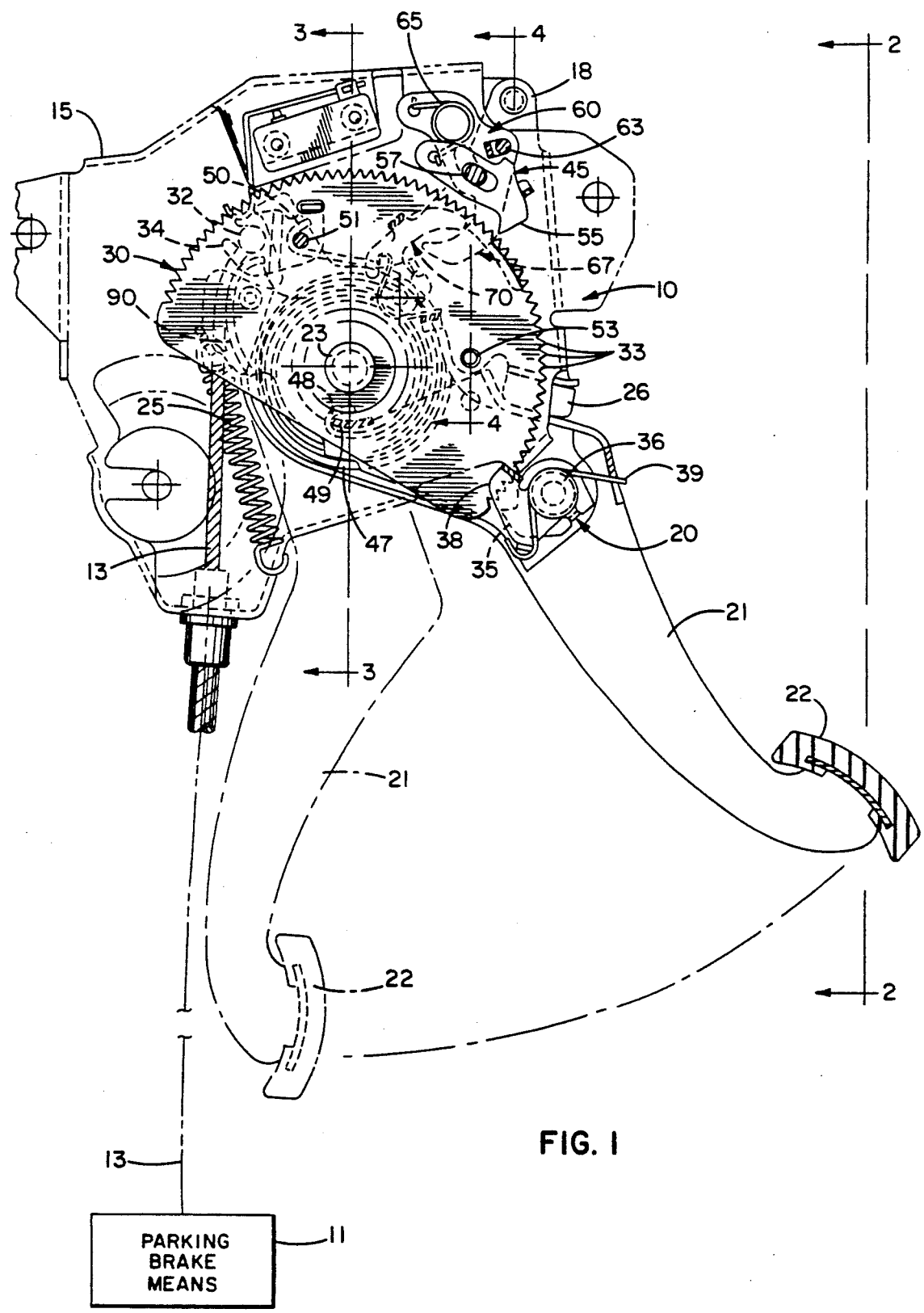
FIG. 1 is a side elevational view of a new and improved parking brake control incorporating the unique features of the present invention and shows the control with the parking brake in a fully released condition.

For purposes of illustration, the invention has been shown in the drawings as incorporated in control apparatus 10 for setting and releasing the parking brake of an automobile or other vehicle. The parking brake itself has been shown schematically by the box 11 in FIG. 1 and includes rear braking elements which are forced into engagement with drums or rotors when force is applied to the braking elements via a flexible cable 13 which is connected to the control 10. Return springs are associated with the braking elements and release the latter when the tensile force applied to the cable by the control is relieved.

Figure 2:
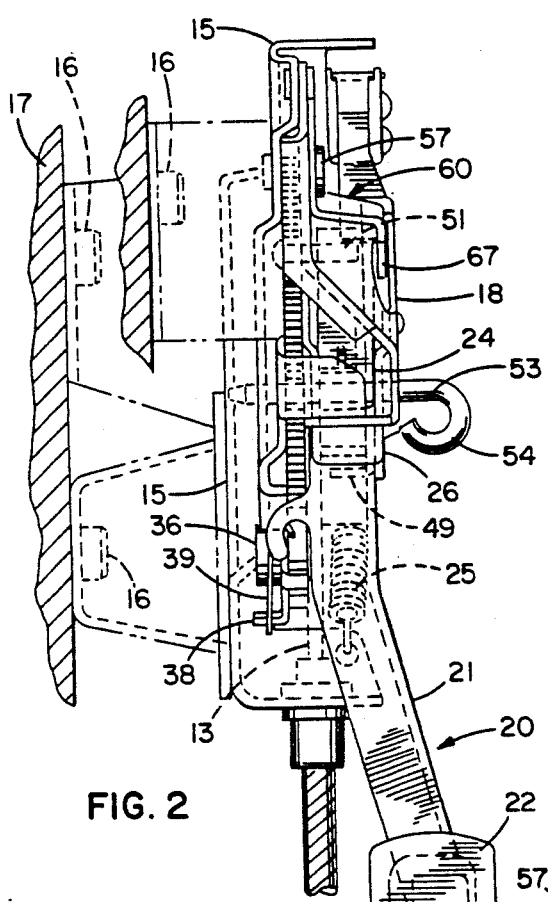
FIG. 2 is an elevational view as seen along the line 2—2 of FIG. 1.

The parking brake control 10 includes a main supporting bracket 15 which is adapted to be attached by fasteners 16 (FIG. 2) to a fixed frame member 17 beneath the instrument panel of the vehicle. A cover 18 is attached to and spaced laterally from the bracket and coacts with the latter to define a housing for several components of the control.

Figure 3:
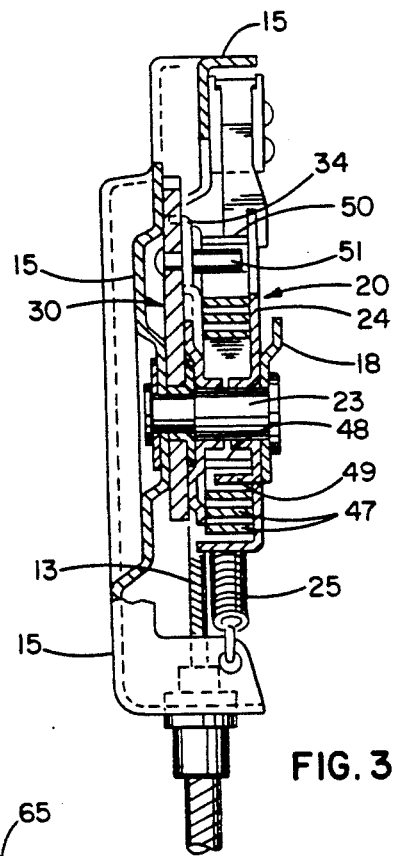
FIGS. 3 and 4 are fragmentary cross-sections taken substantially along the lines 3—3 and 4—4, respectively, of FIG. 1.

Setting of the parking brake 11 is effected in response to clockwise pivoting of an actuating lever 20 which herein is in the form of a foot-operated pedal having an elongated arm 21 with a rubber pad 22 on the lower end thereof. A rivet 23 (FIG. 3) extends through the bracket 15, a generally circular mounting plate 24 of the pedal 20, and the cover 18 and supports the pedal to turn about a laterally extending horizontal axis. Connected between the bracket and the plate 24 of the pedal is a contractile spring 25 which urges the pedal to turn counterclockwise about the rivet 23 and to a brake-released position shown in solid lines in FIG. 1. When the pedal is in its released position, the upper side of the arm 21 engages and is stopped by a rubber bumper 26 on the cover 18.

Figure 5:
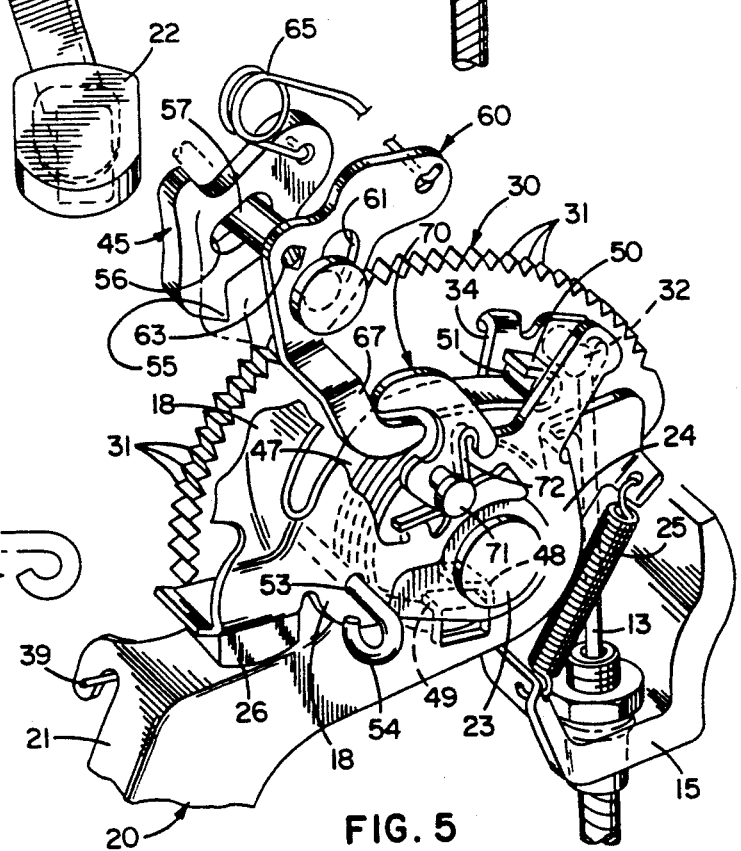
FIG. 5 is an exploded perspective view of the primary components of the control.
Figure 6:
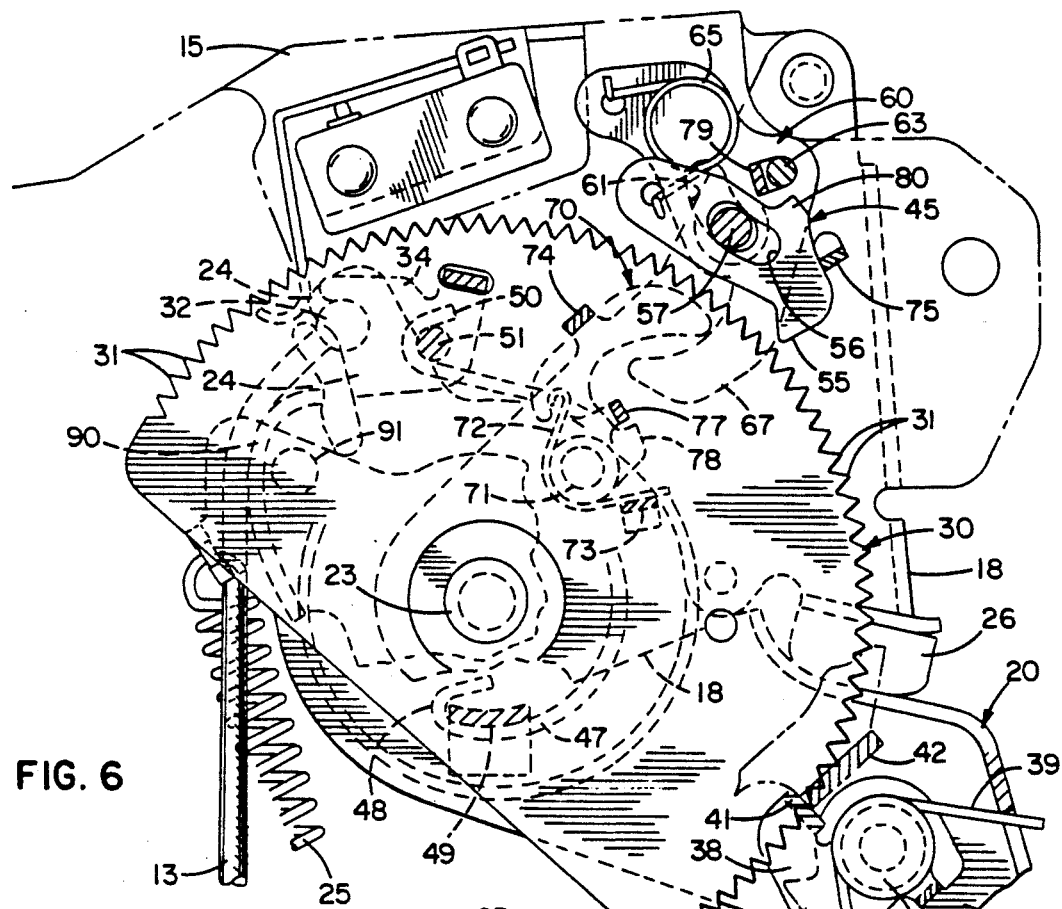
FIG. 6 is an enlarged view of certain components illustrated in FIG. 1 and shows such components as positioned when the parking brake is in a fully released position.

Clockwise turning of the pedal 20 to a brake-applied position shown in phantom lines in FIG. 1 effects clockwise turning of a toothed sector 30 which pulls on the cable 13 to apply the brake 11. The sector 30 is supported to turn about the rivet 23 and is in the form of a flat plate having an edge concentric with the rivet and formed with angularly spaced ratchet teeth 31 (FIGS. 5 and 6). A rod-like connector 32 on the end of the cable 13 fits within a forked bracket 34 (FIG. 5) which is secured rigidly to and projects from one side of the sector, the cable thus being fastened to the sector.

Drive means connect the pedal 20 to the sector 30 and effect clockwise turning of the sector to a brake-applied position when the pedal is depressed clockwise to its brake-applied position. Herein, the drive means includes a toothed pawl 35 (FIG. 6) which is supported to turn about a rivet 36 on the arm 21 of the pedal. When the pedal 20 is first turned to its brake-applied position, the pawl is moved into engagement with one of the teeth 31 of the sector 30 and acts to drive the sector clockwise during further clockwise turning of the pedal. When the brake 11 is released, the sector and the pedal turn counterclockwise in unison and the pawl remains in engagement with the sector until the pedal reaches its brake-released position. At that time, the pawl is kicked out of engagement with the sector.

To move the pawl 35 into and out of engagement with the sector 30, the pawl is carried by a kicker plate 38 (FIG. 6) which also is supported to turn about the rivet 36. A torsion spring 39 is connected between the pedal 20 and a tab 40 on the kicker plate and urges the pawl and the kicker plate clockwise thereby tending to place the pawl in engagement with the sector. When the pedal is in its fully released position, a second tab 41 on the kicker plate engages a lug 42 on the bracket 15 and forces the kicker plate and the pawl counterclockwise about the rivet 36 to hold the pawl out of engagement with the sector. When the pedal is first turned toward its brake-applied position, the tab 41 moves away from the lug 42 to allow the spring 39 to pivot the pawl clockwise into driving engagement with the sector and thereby cause the sector to turn clockwise with the pedal. Upon release of the brake 11, the sector rotates past the pawl as the sector is turned counterclockwise by the brake return springs acting through the cable 13 and as the pedal is turned counterclockwise by the contractile spring 25. When the pedal reaches its released position, the tab 41 of the kicker plate 38 engages the lug 42 of the bracket 15 to pivot the pawl out of engagement with the sector and release the sector from the pedal.

As the sector 30 is turned clockwise toward its brake-applied position, it ratchets past a second pawl 45 (FIG. 5) which engages the sector and holds the sector in its brake-applied position once clockwise turning of the sector is stopped and the brake 11 is set. As will become apparent subsequently, the holding pawl 45 is released automatically from the sector 30 when the pedal 20 is next pushed toward its brake-applied position and thus the control 10 is of the so-called push-to-release type. As also will become apparent subsequently, the holding pawl 45 of the push-to-release control 10 is located out of engagement with the sector 30 when the sector and the pedal are in their brake-released positions.

Figure 4:
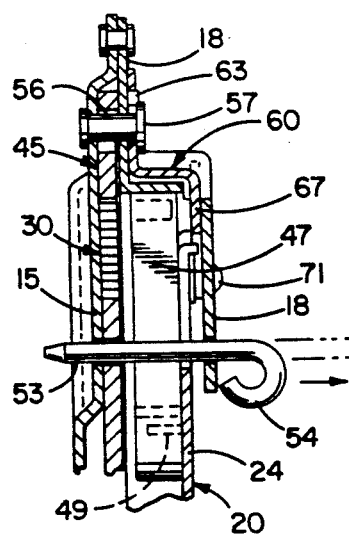

In accordance with one aspect of the present invention, the push-to-release control 10 with its single toothed sector 30 is also self-adjusting following installation of the control in the vehicle in that, once the cable 13 has been hooked to the sector, the sector automatically moves to a position to take up slack in the cable and place the cable and the return springs of the brake 11 under a specified preload. For this purpose, a heavy spirally wound torsion spring 47 (FIGS. 4 and 5) acts against the sector and tends to urge the sector to turn clockwise toward its brake-applied position. During installation of the control, however, the sector is locked against being turned by the spring. Once the cable 13 has been hooked to the sector, the latter is released to the action of the torsion spring 47 and is turned clockwise until the forces exerted on the cable by the torsion spring and the return springs of the brake 11 are equalized.

More specifically, the spring 47 is made of flat spring steel wound into a spiral and sandwiched between the sector 30 and the generally circular plate 24 which forms part of the pedal 20. One bent end 48 (FIG. 6) of the spring is hooked around a tab 49 which is struck from the plate 24. The other bent end 50 of the spring is hooked around a pin 51 extending laterally from the bracket 34 on the sector. The spring is wound in a direction urging the sector toward its brake-applied position and urging the pedal toward its brake-released position.

Once the spring 47 has been wound and attached to the pedal 20 and the sector 30, it is temporarily prevented from rotating the sector toward its brake applied position. For this purpose, a pin 53 (FIG. 4) with a generally C-shaped head 54 is inserted through holes in the cover 18, the sector 30 and the bracket 15. As a result, the pin prevents the sector from rotating under the force of the spring 47. Initially, the torsion spring 47 acts together with the contractile spring 25 to urge the pedal 20 to its brake-released position with the arm 21 of the pedal in engagement with the bumper 26.

The pin 53 remains in place during shipping and installation of the control 10. After attachment of the bracket 15 to the frame 17 and after connection of the cable 13 to the sector 30, the pin is removed as shown in phantom lines in FIG. 4. This releases the sector for turning to its brake-applied position under the force of the spring 47. Since both the driving pawl 35 and the holding pawl 45 are out of engagement with the sector when the pedal 20 is in its released position, such pawls do not interfere with turning of the sector by the spring 47 and relative to the pedal. The spring drives the sector until all slack in the cable 13 has been taken up and until further turning of the sector is stopped by the return springs of the brake 11. The cable and the return springs thus are preloaded to an extent determined by the preload placed in the spring 47.

If the brake 11 or the cable 13 requires servicing, the released pawls 35 and 45 permit the sector to be turned counterclockwise to a position allowing the pin 53 to be re-inserted so as to hold the sector during such servicing.

As shown most clearly in FIG. 5, the holding pawl 45 includes a single tooth 55 and is formed with an elongated slot 56 which enables the pawl to slide and pivot on a rivet 57 secured to the bracket 15 and the cover 18. Also supported by the rivet 57 and disposed in side-by-side relation with the pawl 45 is a toggle lever 60 which is formed with an elongated slot 61 for receiving the rivet. The slot 61 is curved about the axis of a pin 63 (FIG. 6) extending laterally from the bracket 15 and pivotally supporting the toggle lever. Connected to the lever 60 is one leg of a toggle spring 65 whose other leg is connected to the holding pawl 45. When the lever 60 is positioned as shown in FIG. 6, the spring 65 urges the lever clockwise about the pivot 63 and, at the same time, urges the pawl 45 counterclockwise about the rivet 57 and tends to move the pawl tooth 55 out of engagement with the sector 30. When the lever 60 is pivoted counterclockwise to the position shown in FIG. 7, the spring 65 toggles overcenter and urges the pawl 45 clockwise about the rivet 57 so a to force the pawl tooth 55 toward the sector. The spring 65 toggles whenever the point of connection of the spring to the lever 60 passes across a line extending between the rivet 57 and the point of connection of the spring to the pawl 45.

Figure 7:
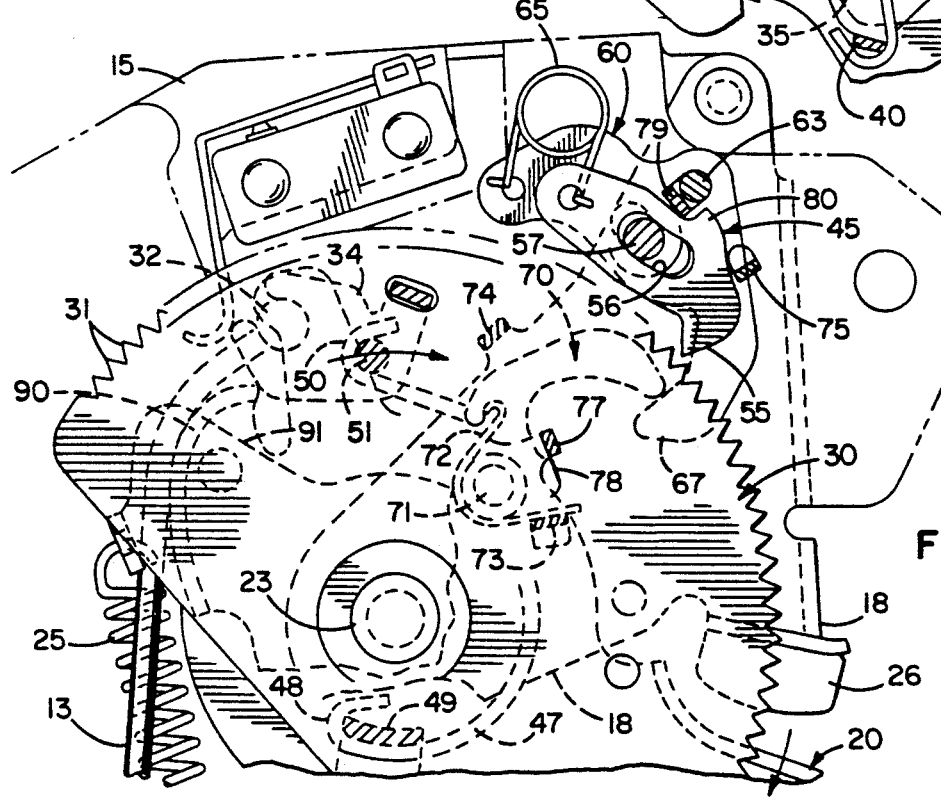
FIG. 7 is a view similar to FIG. 6 but shows the components as positioned when the pedal is initially depressed to apply the brake.
Figure 8:
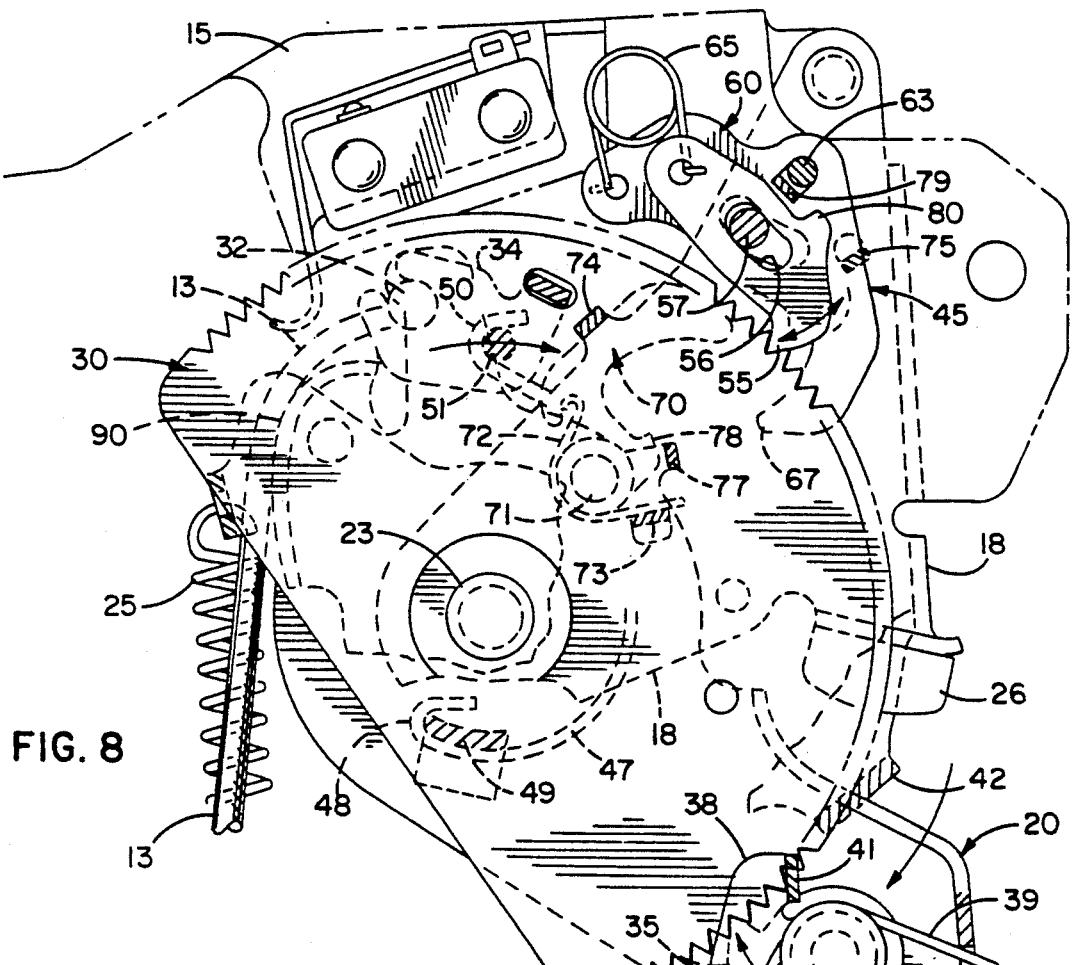
FIG. 8 also is a view similar to FIG. 6 but shows the components as positioned during further application of the brake.

Formed integrally with and extending downwardly and laterally from the lever 60 is a leg 67 which coacts with a toggle reset lever 70 (FIGS. 5 and 6) to cause the lever 60 to swing counterclockwise about the pivot 63 from the position shown in FIG. 6 to the position shown in FIG. 7 when the pedal 20 is first depressed toward its brake-applied position. The toggle reset lever 70 is pivotally supported by a rivet 71 (FIG. 6) on the cover 18, the rivet being received in a slightly elongated slot in the reset lever so as to enable limited sliding movement of the reset lever in a direction extending transversely of the rivet. A torsion spring 72 on the rivet engages the reset lever and a tab 73 on the cover 18 and urges the reset lever counterclockwise about the rivet and into engagement with another tab 74 on the cover.

After the control 10 has been installed and the pin 53 has been pulled, the components of the control are positioned as shown in FIG. 6 when the parking brake 11 is released and the pedal 20 and the sector 30 are in their brake-released positions. As shown, the reset lever 70 is held against counterclockwise turning by the tab 74. The right end of the slot 61 in the toggle lever 60 engages the rivet 57 to hold that lever against being pivoted clockwise by the toggle spring 65. The toggle spring urges the holding pawl 45 counterclockwise about the rivet 57 and against a stop tab 75 on the cover 18 and keeps the pawl tooth 55 out of engagement with the sector 30, the pawl being positioned such that the left end of the slot 56 bears against the shank of the rivet. Because the toggle spring 65 holds the pawl out of engagement with the sector when the pedal 20 is in its released position, and because the driving pawl 35 also is released from the sector, the sector is, as discussed previously, free to turn relative to the pedal when the pin 53 is pulled and releases the sector to the action of the spiral spring 47.

When the pedal 20 is first depressed to engage the brake 11, a lug 77 on the pedal moves into engagement with an ear 78 on the reset lever 70 as shown in FIG. 7 and pivots the reset lever clockwise about the rivet 71. As a result, the reset lever acts against the leg 67 of the toggle lever 60 to pivot the latter counterclockwise about the pin 63 and cause the spring 65 to toggle overcenter. To promote the overcenter action, a tab 79 on the lever 60 engages an ear 80 on the pawl 45 and rocks the pawl clockwise about the rivet 57. Once the spring toggles, it urges the pawl 45 clockwise about the rivet 57 and forces the pawl tooth 55 toward the sector 30. At about the same time that the spring 65 toggles overcenter, the lug 77 of the pedal clears the ear 78 of the reset lever 60 to allow the spring 72 to return that lever to its original position against the tab 74.

By virtue of the pawl 45 being urged clockwise about the rivet 57 by the toggled-over spring 65, the pawl tooth 55 engages the sector 30 and ratchets across the teeth 31 of the sector as the latter is driven to its brake-applied position by the pedal 20. When the pushing force on the pedal is stopped, the pawl tooth 55 engages one of the ratchet teeth 31. The tension in the cable 13 tends to turn the sector counterclockwise and, as a result of such turning, the sector tooth 31 acts against the pawl tooth 55 to slide the pawl 45 from right-to-left along the rivet 57 until the right end of the slot 56 in the pawl bottoms against the rivet. The pawl and the sector thus are stopped with the pawl serving to hold the sector in its brake-applied position.

Figure 9:
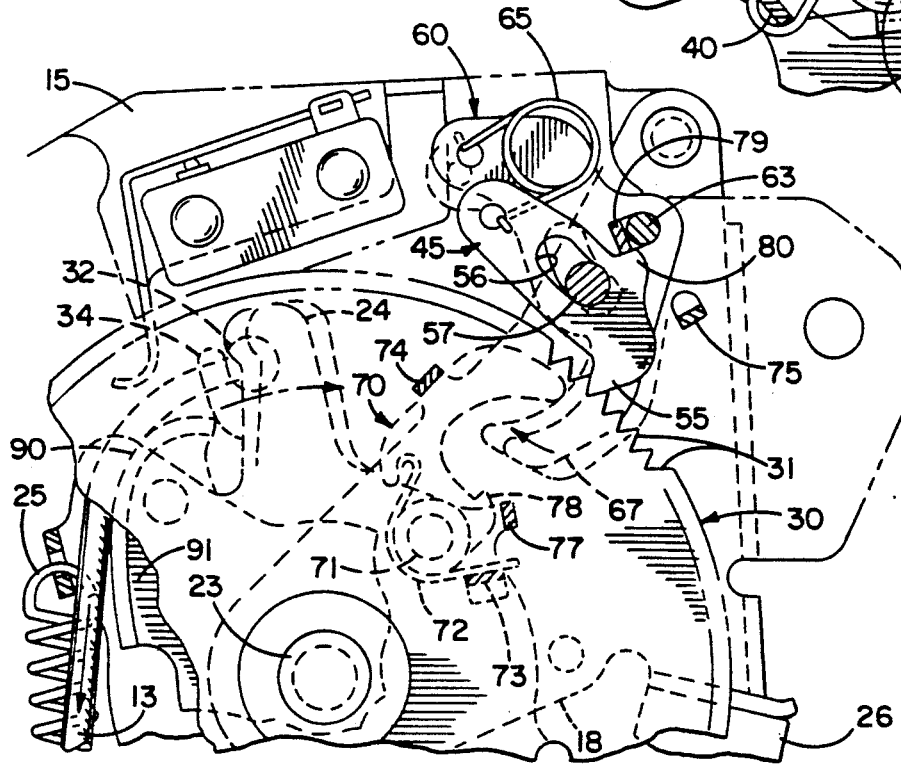
FIG. 9 is another view similar to FIG. 6 but shows the components as positioned after the brake has been applied.

As the pawl 45 is slid from right-to-left on the rivet 57 by the sector tooth 31, the ear 80 on the pawl engages the tab 79 on the lever 60 and causes the lever to rock clockwise about the pin 63. As a result, the spring 65 toggles in the reverse direction as shown in FIG. 9 and tends to urge the pawl 45 away from the sector 30. The pawl tooth 55, however, remains in holding engagement with the sector tooth 31 by virtue of the counterclockwise force exerted on the pawl tooth by the sector tooth. As a result, the sector is held in its brake-applied position even though the toggle spring 65 is urging the pawl counterclockwise toward its released position.

When it is desired to release the brake 11, the pedal 20 is pushed further in the brake-applying direction. This turns the sector 30 clockwise to release the counterclockwise pressure exerted by the sector tooth 31 against the pawl tooth 55. As a result, the toggle spring 65 pivots the pawl 45 to its released position shown in FIG. 6 to allow the sector and the pedal to return to their released positions. As the pedal returns, the lug 77 of the pedal cams against the ear 78 of the reset lever 70 and the latter slides a slight distance on the rivet 71 to enable the lug to clear the ear and return to the position of FIG. 1.

Advantageously, a variable ratio cam 90 (FIG. 6) is utilized to create a varying mechanical advantage and reduce the manual force required to be exerted on the pedal as the brake 11 is fully applied. In this instance, the cam is a curved member which engages the cable 13 adjacent the connector 32 and which is integral with a mounting plate 91 secured rigidly to the pedal. As the pedal is turned to its brake-applied position, the cable wraps around the cam to provide a mechanical advantage amplifying the force applied to the pedal and lowering the manual effort required to set the brake 11. The tension in the cable acts against the cam to hold the pedal in its brake-applied position until the sector 30 is released to relieve the tension.

Since the cam 90 is carried by the pedal, it may be of variable ratio so as to produce a mechanical advantage which becomes progressively greater as the pedal is pushed progressively further toward its brake-applied position. Thus, the radial distance between the active surface of the cam and the pivot axis 23 of the pedal is relatively large at the point where the cable 13 first engages the cam when the brake is released and becomes progressively smaller as the cam surface proceeds in a counterclockwise direction. Accordingly, when the pedal is first depressed and the clamp load of the brake 11 is relatively small, the mechanical advantage is relatively small, and movement of the pedal through a given distance produces substantial movement of the cable. As the pedal is depressed further and the clamp load becomes higher, the cam 90 causes the cable travel to decrease for a given movement of the pedal and thus causes the mechanical advantage to increase. In this way, the pedal may be moved through its entire range with increasing mechanical advantage rather than requiring significantly greater effort as the brake becomes more fully set and the clamp load increases.

From the foregoing, it will be apparent that the present invention brings to the art a new and improved parking brake control 10 having but a single sector 30 but having both self-adjust and push-to-release capability. In addition, with the cam 90 being carried by the pedal 20 rather than by the sector, a progressively increasing mechanical advantage is obtained by the self-adjusting control as the brake 11 is progressively applied.

We claim:

1. Apparatus for applying and releasing a vehicular parking brake having an operating cable, said apparatus comprising a mounting bracket, a toothed sector adapted for connection to said cable, an operating lever, said sector and said lever being supported on said bracket to turn about a predetermined axis between brake-released positions and brake-applied positions, drive means for turning said sector toward the brake-applied position of the sector when said lever is turned toward the brake-applied position of the lever, a pawl movably supported on said bracket and having a tooth selectively engageable with said sector and to hold said sector in the brake-applied position of the sector, said tooth being movable out of engagement with said sector to free said sector and said lever for movement to said brake-released positions, and means acting on said pawl for (A) holding said tooth out of engagement with said sector when said lever is in the brake-released position of the lever, (B) releasing said tooth for movement into engagement with said sector as an incident to initial movement of said lever toward the brake-applied position of the lever, (C) urging said tooth into ratcheting engagement with said sector during continued movement of said lever toward the brake-applied position of the lever and (D) urging said tooth toward a position out of engagement with said sector after movement of said lever toward the brake-applied position of the lever is stopped whereby said tooth moves out of engagement with said sector as an incident to the next movement of said lever toward the brake-applied position of the lever, said drive means and said pawl permitting said sector to turn relative to said lever and toward the brake-applied position of the sector when said lever is in the brake-released position of the lever, a torsion spring connected to said sector and urging said sector toward the brake-applied position of the sector, means temporarily fixing said sector against rotation when said lever is in the brake-released position of the lever and preventing said spring from turning said sector relative to said lever and toward the brake-applied position of the sector, said fixing means being releasable after connection of said cable to said sector thereby to enable said spring to turn said sector relative to said lever and toward the brake-applied position of the sector to apply a tensioning force to said cable, said sector being the only toothed sector of said apparatus.

2. Apparatus for applying and releasing a vehicular parking brake having an operating cable, said apparatus comprising a mounting bracket, a toothed sector adapted for connection to said cable, an operating lever, said sector and said lever being supported on said bracket to turn about a predetermined axis between brake-released positions and brake-applied positions and being capable of turning relative to one another about said axis, drive means for turning said sector toward the brake-applied position of the sector when said lever is turned toward the brake-applied position of the lever, said lever turning toward the brake-released position of the lever when said sector turns toward the brake-released position of the sector, pawl means having a tooth selectively engageable with said sector for selectively holding said sector in the brake-applied position of the sector, said drive means and said pawl means permitting said sector to turn relative to said lever and toward the brake-applied position of the sector when said lever is in the brake-released position of the lever, a torsion spring connected to said sector and urging said sector toward the brake-applied position of the sector, means temporarily fixing said sector against rotation when said lever is in the brake-released position of the lever and preventing said spring from turning said sector relative to said lever and toward the brake-applied position of the sector, said fixing means being releasable after connection of said cable to said sector thereby to enable said spring to turn said sector relative to said lever and toward the brake-applied position of the sector to apply a tensioning force to said cable, and means acting on said pawl means for (A) holding said tooth out of engagement with said sector when said lever is in the brake-released position of the lever, (B) releasing said tooth for movement into engagement with said sector as an incident to initial movement of said lever toward the brake-applied position of the lever, (C) urging said tooth into ratcheting engagement with said sector during continued movement of said lever toward the brake-applied position of the lever and (D) urging said tooth toward a position out of engagement with said sector after movement of said lever toward the brake-applied position of the lever is stopped whereby said tooth moves out of engagement with said sector as an incident to the next movement of said lever toward the brake-applied position of the lever, said sector being the only toothed sector of said apparatus.

3. Apparatus as defined in claim 2 in which said fixing means comprise a removable pin connected between said sector and said bracket and preventing rotation of said sector relative to said bracket.

4. Apparatus as defined in claim 2 further including cam means on said lever and having a surface engageable with said cable when said lever is turned toward the brake-applied position of the lever, said cam surface being curved about said axis and having a progressively changing radius.

5. Apparatus for applying and releasing a vehicular parking brake having an operating cable, said apparatus comprising a mounting bracket, a toothed sector adapted for connection to said cable, an operating lever, said sector and said lever being supported on said bracket to turn about a predetermined axis between brake-released positions and brake-applied positions and being capable of turning relative to one another about said axis, drive means for turning said sector toward the brake-applied position of the sector when said lever is turned toward the brake-applied position of the lever, said lever turning toward the brake-released position of the lever when said sector turns toward the brake-released position of the sector, cam means on said lever and engageable with said cable when said lever is turned toward the brake-applied position of the lever, pawl means having a tooth selectively engageable with said sector for selectively holding said lever in the brake-applied position of the lever, said drive means and said pawl means permitting said sector to turn relative to said lever and toward the brake-applied position of the sector when said lever is in the brake-released position of the lever, a torsion spring connected to said sector and urging said sector toward the brake-applied position of the sector, means temporarily fixing said sector against rotation when said lever is in the brake-released position of the lever and preventing said spring from turning said sector relative to said lever and toward the brake-applied position of the sector, said fixing means being releasable after connection of said cable to said sector thereby to enable said spring to turn said sector relative to said lever and toward the brake-applied position of the sector to apply a tensioning force to said cable, said sector being the only toothed sector of said apparatus.

6. Apparatus as defined in claim 5 in which said cam means includes a cam surface curved about said axis, said cam surface having a progressively changing radius.

* * * * *